US008132488B2

(12) United States Patent
Kaneko et al.

(10) Patent No.: US 8,132,488 B2
(45) Date of Patent: Mar. 13, 2012

(54) SHEET CUTTING DEVICE AND SHEET POST-PROCESSING DEVICE

(75) Inventors: Masahiro Kaneko, Hino (JP); Toshio Shida, Higashiyamato (JP); Hiroyuki Wakabayashi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 867 days.

(21) Appl. No.: 11/182,784

(22) Filed: Jul. 18, 2005

(65) Prior Publication Data

US 2006/0086223 A1 Apr. 27, 2006

(30) Foreign Application Priority Data

Oct. 21, 2004 (JP) ................................ 2004-306486

(51) Int. Cl.
*B23Q 15/00* (2006.01)
*B26D 5/00* (2006.01)

(52) U.S. Cl. ................ 83/72; 83/76.1; 83/155; 83/206; 83/375; 83/401; 83/453; 83/597

(58) Field of Classification Search .................... 83/638, 83/699.11, 699.41, 858, 523, 93, 956, 76.1, 83/76.6, 76.9, 72, 111, 155, 202, 206, 374, 83/375, 378–380, 383, 384, 401, 405, 451–453, 83/467.1, 468.1, 597, 613, 616, 630, 604
See application file for complete search history.

(56) References Cited

U.S. PATENT DOCUMENTS 1,926,669 A * 9/1933 Dodd ............................ 83/377
1,952,073 A * 3/1934 Jones ............................ 83/459
3,182,542 A * 5/1965 Cochran ......................... 83/453
5,131,301 A * 7/1992 Gergek ........................... 83/13
5,488,886 A 2/1996 Mohr
6,234,054 B1 * 5/2001 Heutschi ........................ 83/155
6,520,058 B2 * 2/2003 Nakajima et al. ............... 83/206
2004/0096253 A1 * 5/2004 Ueno et al. .................... 399/385
2006/0081106 A1 * 4/2006 Nishimura et al. ............ 83/665

FOREIGN PATENT DOCUMENTS

JP 57-1698 1/1982

(Continued)

OTHER PUBLICATIONS

English translation of Japanese Office Action.

(Continued)

*Primary Examiner* — Phong Nguyen

(74) *Attorney, Agent, or Firm* — Finnegan, Henderson, Farabow, Garrett & Dunner, LLP

(57) ABSTRACT

A sheet cutting device, including a cutting blade for cutting a bundle of sheets, while moving in a slanted direction compounded by a direction perpendicular to the surface of sheet and a direction parallel to the sheet surface; a supporting member for supporting the bundle of sheets in the vicinity of a cutting position; a pressing section to press the bundle of sheets against the supporting member in a direction reverse to a moving direction of the cutting blade and perpendicular to the sheet surface, and the pressing section to receive the cutting blade at the time when the cutting blade cuts the bundle of sheets; a cutting blade driving section to drive the cutting blade; a pressing section driving section to drive the pressing section; and a control section to release pressing of the bundle of sheets and retract the cutting blade, after the bundle of sheets is cut.

6 Claims, 9 Drawing Sheets

FOREIGN PATENT DOCUMENTS

| | | | |
|---|---|---|---|
| JP | 11-348451 | | 12/1999 |
| JP | 2000-254892 | | 9/2000 |
| JP | 2001-252890 | | 9/2001 |
| JP | 2002-347291 | * | 12/2002 |
| JP | 2003-136471 | | 5/2003 |
| JP | 2003 191196 | | 7/2003 |
| JP | 2003 211390 | | 7/2003 |

OTHER PUBLICATIONS

Office Action from Japanese Patent Office mailed May 27, 2008, 3 pgs.
English Translation of the Office Action from Japanese Patent Office mailed May 27, 2008, 3 pgs.
English translation of Japanese Office Action, Aug. 14, 2007.

* cited by examiner

SHEET CUTTING DEVICE AND SHEET POST-PROCESSING DEVICE

This application is based on Japanese Patent Application No. 2004-306486 filed on Oct. 21, 2004 in Japanese Patent Office, the entire content of which is hereby incorporated by reference.

BACKGROUND OF THE INVENTION

The present invention relates to a sheet cutting device enable of cutting simultaneously a plurality of sheets, and in particular, to a sheet cutting device which can be installed in an image forming system, such as a copy machine, a printer, a facsimile, and a compound apparatus which includes more than two functions of the above functions, and to a sheet post-processing device incorporating the sheet cutting device described above.

As the sheet post-processing device which is installed in a system of the image forming apparatus, apparatuses have been developed which produce booklets via bundling a plurality of sheets. In most of the sheet post-processing devices, the bundles of sheets are folded at their central sections, then bound at the central sections, after which, facing sections to the bound sections, that is, the edges opposite the bound edges are cut by the sheet cutting device, resulting in a uniformly edged booklet.

Since the sheet cutting device to be installed in the sheet post-processing device is structured as part of the image forming apparatus installed in copy centers or offices, it must be small-sized, as well as working with low power consumption, and further, it is necessary that the function to produce uniformly edged booklets is always maintained. If the cut edges are uneven, or uncut portions remain, the booklet cannot be opened smoothly, which is of course a major problem.

On the other hand, a sheet cutting apparatus used in the production process of a great number of the same booklets, such as printed matter, is a large-scale operation and driven by great electric power, accordingly, such sheet cutting apparatus need only be good enough to exhibit high cutting performance. However, concerning the sheet cutting device used as a part of the image forming apparatus, the essential condition is that the device is operable with small electric power, and is small in overall size. Therefore, design in ingenuity is necessary to perform functions beyond the large-scale sheet cutting apparatus.

Japanese Unexamined Patent Publication No. 2003-136471 (hereinafter referred to as the Patent Document) discloses a sheet cutting device wherein the sheets are trimmed by a cutter which is pressed against the sheet surface at a slant, as the sheet cutting device which can be used in a business machine.

The sheet cutting device disclosed in the Patent Document cuts the sheets with a cutter strongly pressed against the sheet, while the bundle of sheets is secured under high pressure. This sheet cutting device takes a few seconds to a few ten seconds for one process of cutting a bundle of a few ten or a few thousand sheets, and during this process, the bundle of the sheets are secured as it is at the cutting position.

In order to increase working efficiencies of the sheet post-processing device incorporating the sheet cutting device, as well as the image forming system incorporating the sheet post-processing device, it is essential that the time interval for securing the bundle of sheets at the cutting position is reduced as far as possible. Further, according to the structure described in the Patent Document, the pressing member also works as a receiving section of the cutter blade. Therefore, when the cutter blade is moved in the slanted direction for cutting the sheets, the cutter blade breaks into the pressing member, while moving in the slanted direction. Still further, after cutting, when the cutter blade is released from the pressing member, a large noise is produced by friction.

SUMMARY

There thus exists a need to provide to offer a sheet cutting device which can increase the working efficiency of the sheet post-processing device or the image forming system, without producing the large noise, as well as to offer a sheet cutting device incorporating the same sheet cutting device.

The present invention provides a sheet cutting device, including:

a cutting blade for cutting a bundle of sheets, while moving in the slanted direction being a compounded movement perpendicular to the sheet surface and parallel to the sheet surface;

a supporting member for supporting the bundle of sheets in the vicinity of cutting position;

a pressing section to press the bundle of sheets against the supporting member in the direction reverse to the moving direction of the cutting blade and perpendicular to the sheet surface, and to receive the cutting blade when the cutting blade trims the bundle of sheet;

a cutting blade driving means to drive the cutting blade;

a pressing section driving means to drive the pressing section; and a control section to release pressing of the bundle of sheets and retract the cutting blade, after the bundle of sheets is cut.

DETAILED DESCRIPTION OF THE PREFERRED EMBODIMENTS

Figure 1:
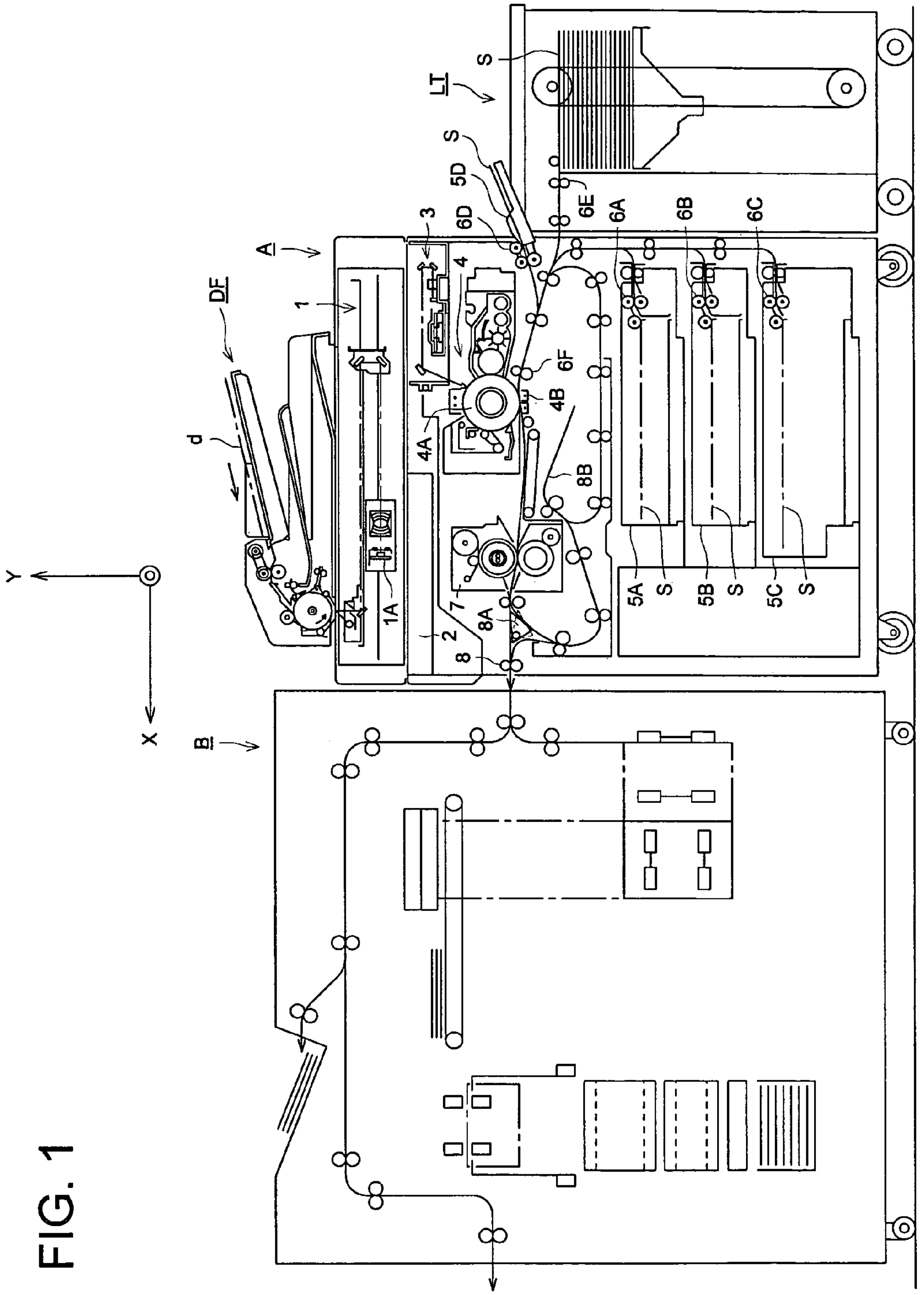
FIG. 1 shows a total structural view of the image forming system including the sheet post-processing device relating to the embodiment of the present invention.

The embodiments of the present invention will be detailed below referring to the drawings.

FIG. 1 shows a total structural view of the image forming system featuring the sheet cutting device and the sheet post-processing device of the present invention.

Symbol A is the image forming apparatus, symbol DF is an automatic document feeding device, symbol LT is a large capacity sheet feeding section, and symbol B is the post-processing device.

Image forming apparatus A includes image reading section (image input device) 1, image processing section 2, image writing section 3, image forming section 4, sheet feeding cassettes 5A, 5B, and 5C, manual sheet feeding tray 5D, first sheet feeding sections 6A, 6B, 6C, 6D, and 6E, paired registration rollers 6F, fixing device 7, sheet ejection section 8, and automatic duplex copy sheet feeding section (ADU) 8B.

Automatic document feeding device DF is located on image forming apparatus A, and post-processing device B is integrally connected on the left side of image forming apparatus A in FIG. 1.

Documents d are placed on a document stand of automatic document feeding device DF, and fed in the arrowed direction, after which, document d passes through the optical system of image reading section 1, where images on a single surface or double surfaces of document d are read by image sensor 1, being a CCD.

The read images are converted to analog signals by image sensor 1A. Analog signals are conducted with respect to analog process, A/D conversion, shading correction, and image compression, by which the analog signals are changed to image information signals, and sent to image writing section 3.

Image forming section 4 is a section to form the image via an electro-photographic process incorporating various processes, such as electronic charging, exposure, development, toner image transferring, sheet separation and drum cleaning, all of which are conducted on photosensitive drum 4A. During the above exposure process, laser rays are outputted from a semiconductor laser device (which is not illustrated), based on the above-mentioned image information signals, and radiated onto photosensitive drum 4A, on which an electrostatic latent image is thereby created. In addition, during the above development process, toner images corresponding to the electrostatic latent images are formed.

After a user appropriately selects one of sheet feeding cassettes 5A-5C, manual sheet feeding tray 5D, or large capacity sheet feeding section LT, as well as one of first sheet feeding sections 6A-6E, corresponding to the above selection, sheet S is conveyed to paired registration rollers 6F. Sheet S is synchronized with the toner images on photosensitive drum 4A by paired registration rollers 6F, and conveyed to transfer means 4B, where the toner images are transferred onto sheet S.

Sheet S, carrying the toner image, is fixed at fixing device 7, and conveyed to post-processing device B via sheet ejecting section 8.

In the case of image formation on both surfaces, sheet S having an image formed on one surface is conveyed to automatic duplex copy sheet feeding section 8B via conveyance path changing plate 8A, and an image is formed on the other surface of sheet S at image forming section 4, after which the image is fixed by fixing device 7, and conveyed to post-processing device B via sheet ejecting section 8.

Next, the outline of post-processing device B will be explained referring to FIGS. 2, 3, 4 and 5.

Figure 2:
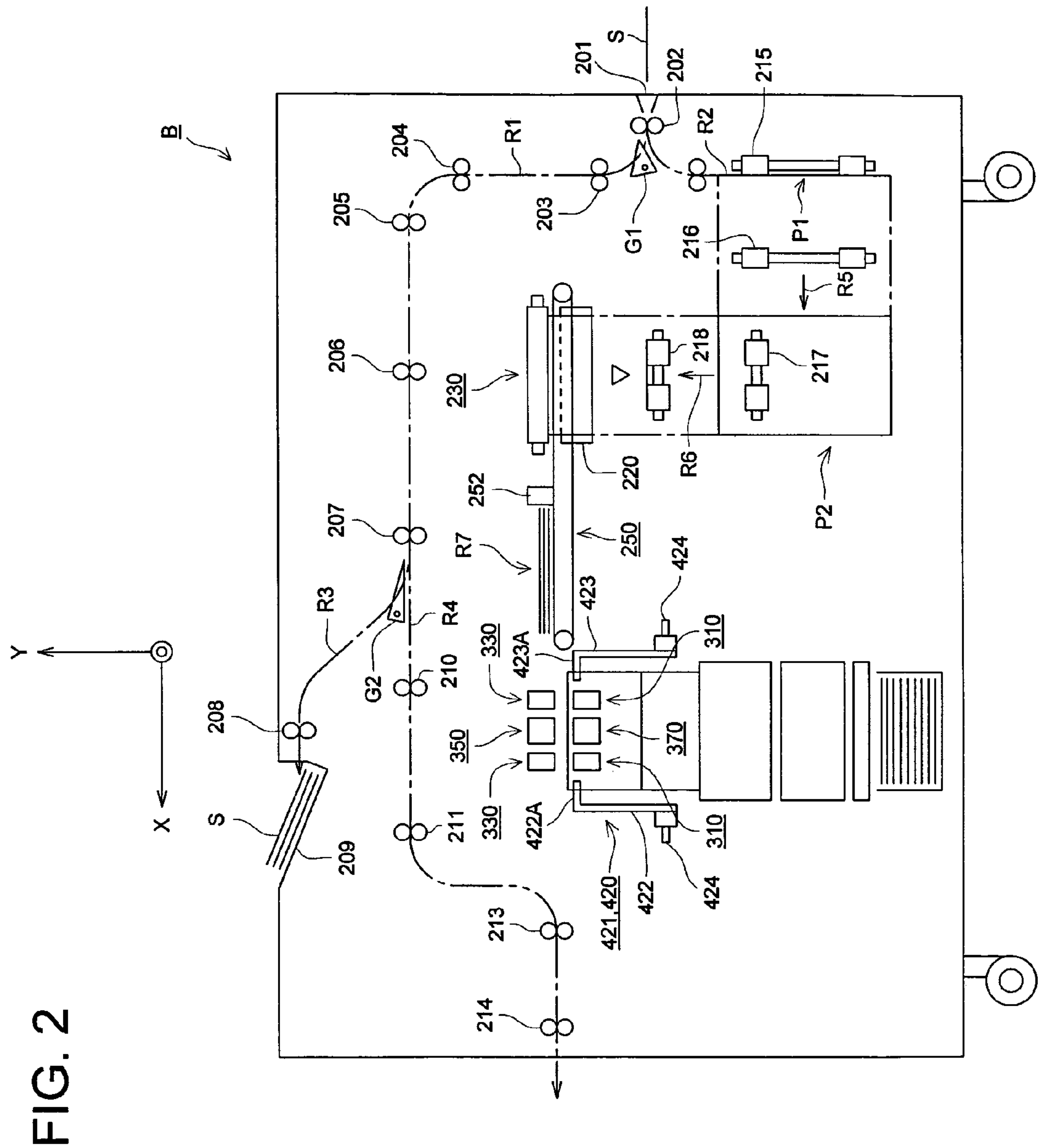
FIG. 2 is an exposed front view of the post-processing device relating to the embodiment of the present invention.
Figure 3:
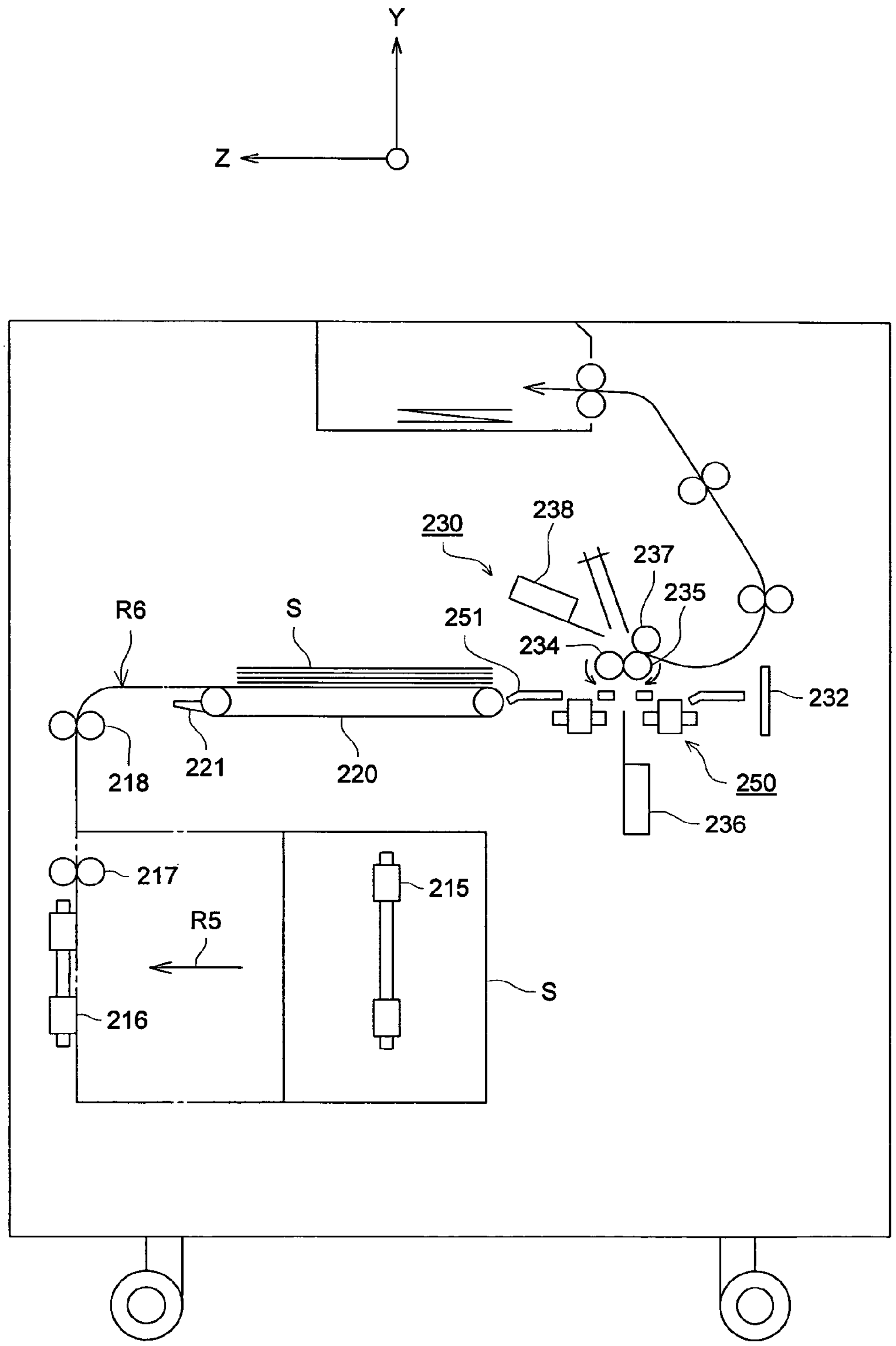
FIG. 3 is an exposed view of the right side of the post-processing device shown in FIG. 2.
Figure 4:
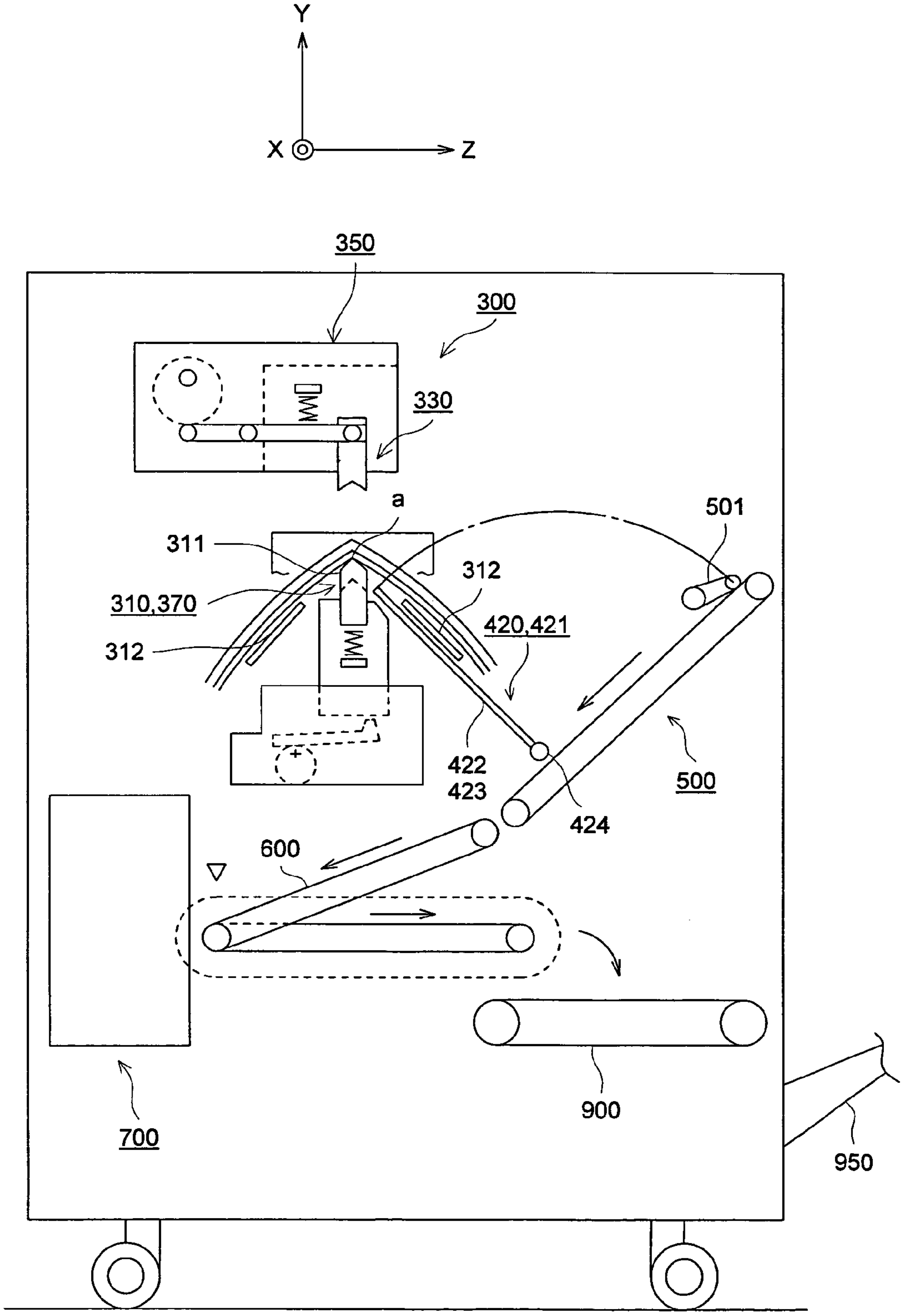
FIG. 4 is an exposed view of the left side of the post-processing device shown in FIG. 2.
Figure 5:
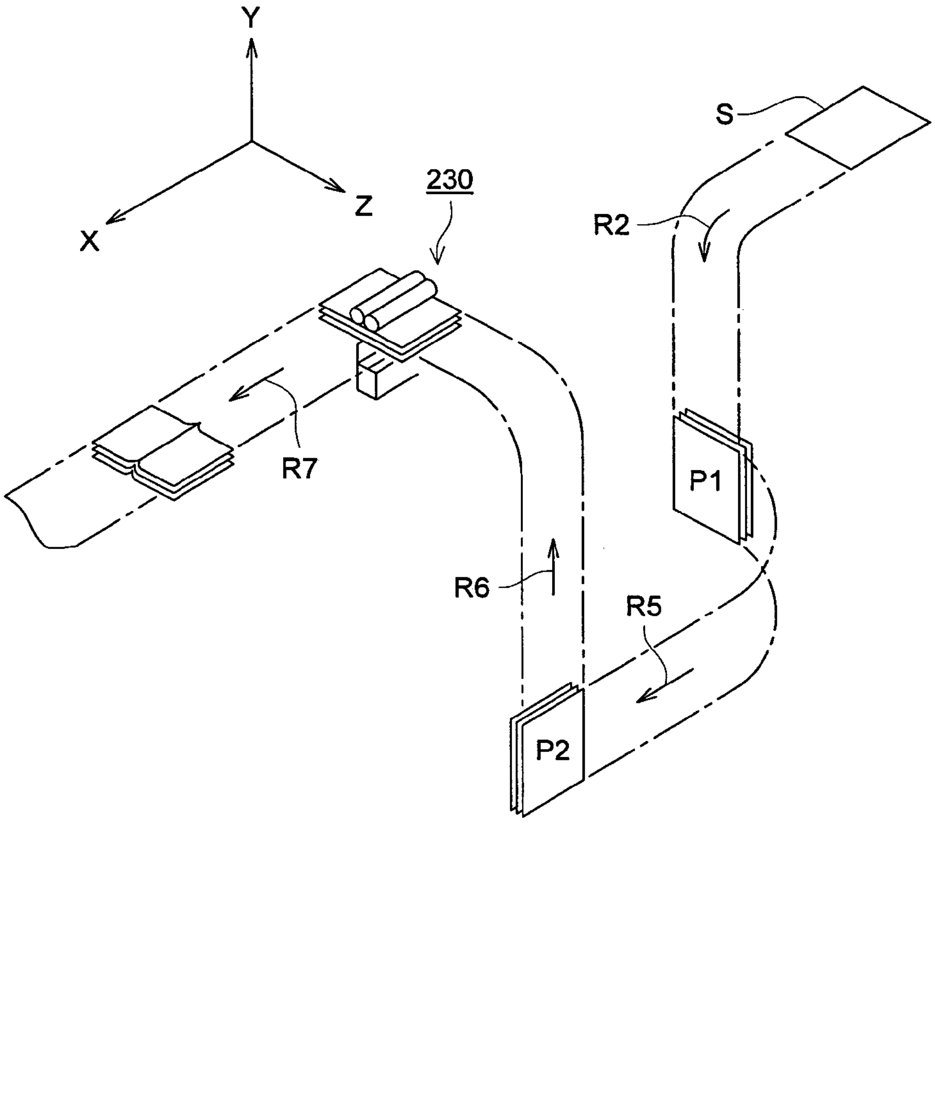
FIG. 5 is a diagram showing the flow of the bundle of sheets in the post-processing system.

FIG. 2 is an exposed view of the front of the post-processing device relating to the embodiment of the present invention. FIG. 3 is an exposed view of the right side of the post-processing device. FIG. 4 is an exposed view of the left side of the post-processing device. FIG. 5 is a diagram showing the flow of the bundle of sheets in the post-processing system.

In each drawing, arrows X, Y and Z show rectangular coordinate axes, and each positive direction is referred to as direction X, direction Y and direction Z, while each negative direction is referred to as inverse direction X, inverse direction Y and inverse direction Z.

In addition, when an arrow faces the surface of the paper and perpendicular to the page surface, double circle mark "◎" is shown in FIGS. 1, 2 and 4, while an arrow faces the reverse side of the page surface, single circle mark "○" is shown in FIG. 3.

After the image formation onto sheet S at image forming apparatus A, at the entrance of post-processing device B, sheet S is conveyed to one of two conveyance paths through one of which sheet S is immediately ejected, and the other conveyance path through which sheet S is folded at the center, stapled and bound.

A plurality of sheets S, conveyed into the path for the center folding and binding processes, are center-folded in the overlapped condition, after which, they are placed on a stacking means. When the number of the stacked bundles of sheets reaches a predetermined number, the bundled sheets are bound, and picked up by a bundle pickup means, after which the edges of the bound sheets are cut by the cutting device of the present invention, and ejected onto sheet ejection tray 950 as shown in FIG. 4.

Now, the conveyance path of sheet S entering conveyance path R1 will be explained, referring to FIG. 2.

Sheet S, entering conveyance path R1 via conveyance path changing means G1, is nipped and conveyed by paired conveyance rollers 203-207, and conveyed to either conveyance path R3 located above conveyance path changing means G2, or conveyance path R4 located below conveyance path changing means G2.

Sheet S, conveyed into conveyance path R3, is ejected onto sub-ejection tray (which is top tray) 209 located at the upper section of post-processing device B via paired ejection rollers 208.

Sheet S, conveyed into conveyance path R4, is nipped and conveyed by paired conveyance rollers 210-213, and conveyed to other post-processing devices by paired ejection roller 214.

Next, the conveyance path of sheet S entering conveyance path R2 will be explained, referring to FIGS. 2 and 5.

Sheet S, entered conveyance path R2 by conveyance path changing means G1, is conveyed in inverse direction Y, and then temporarily stops at predetermined position (position P1 in FIG. 2 to be stored.

At position P1, following sheets S, which are relatively small in number, are overlapped and stored.

The number of the stored sheets, described above, is three, however, the number of the sheets to be stored is not limited to three, and can be set according to need.

Three individual sheets stored at position P1 are overlapped, and which are conveyed in direction Z by paired conveyance rollers 215 and 216, and by a guide plate (which is not illustrated), after which, three individual sheets are directed to direction X and temporarily stop at position P2 (conveyance path R5).

In the following explanation, a plurality of sheets which are overlapped are referred to as bundled sheets SS.

Bundled sheets SS temporarily stopped at Position P2 are conveyed at a predetermined timing in direction Y via paired conveyance rollers 217, 218, and a guide plate, after which they are directed in inverse direction z (conveyance path R6).

Bundled sheets SS directed in inverse direction Z are conveyed to center folding means 230 via conveyance-alignment belt 220.

Center folding means 230 will now be described while referring to FIG. 3.

In the present embodiment, the longer edge of bundled sheets SS fall into line with the conveyance direction of conveyance-alignment belt 220.

Center folding means 230 is structured of alignment member 232, center folding rollers 234 and 235, and knife edge 236 for center folding.

Alignment member 232 is positioned away from the contact point of center folding rollers 234 and 235, by one-half the length of the longer edge of bundled sheets SS.

Bundled sheets SS conveyed in inverse direction Z are pushed by alignment pusher 221 mounted on convey-alignment belt 220, and conveyed onto guide plate 251 which structures after-mentioned folded sheet conveyance means 250, after which, the tops of bundled sheets SS strike alignment plate 232, by which, bundled sheets SS stop.

Subsequently, alignment pusher 221 moves backward and forward by the counterclockwise-counter rotation of convey-alignment belt 220, and thereby, the ends of bundled sheets SS (three sheets) are pushed so that the width of bundled sheets SS are aligned in the conveyance direction.

After which, knife edge (for center folding) 236, located below the contact point of center folding rollers 234 and 235, pushes up the longitudinal center of bundled sheets SS placed on guide plates 251, and thereby, bundled sheets SS are nipped by center folding rollers 234 and 235 which are rotating in the arrowed directions as shown in FIG. 3.

A creased fold is formed at the center of nipped bundled sheets SS by center folding rollers 234 and 235, after which, bundled sheets SS are returned onto guide plates 251 by the reversed rotations of folding rollers 234 and 235, and then, folded bundled sheets SS are conveyed in direction X by folded sheet conveyance means 250, which will be explained later.

When the size of the sheets is changed, a controller, which is not illustrated, changes the position of alignment plate 232, and the operation of conveyance-alignment belt 220, based on the size of sheet.

In addition, bundled sheets SS can also be folded into a Z-shape (fold in three) by rollers 234, 235 and 237, and knife edge 238.

Again in FIGS. 2 and 5, bundled sheets SS, having been folded at the center of the longitudinal center and perpendicular to the longer edge, are conveyed in direction X by conveyance stop 252 mounted on the conveyance belt of folded sheet conveyance means 250, and also by a guide plate which is not illustrated, and finally bundled sheets SS having the creased fold are stacked on stacking means 310 via conveyance path R7.

Next, stacking means 310, as well as stapling means 350 and staple backup means 370, both of which are binding means, are explained referring to FIG. 4.

Stacking means 310 is composed of fold centering member 311 which is a reversed-V shape, and edge aligning members 312 both of which also compose a reversed-V shape. Fold centering member 311 supports the bundled sheets at fold “a” which is the concave side of creased fold and bundled sheets SS. Edge aligning members 312 supports the edges of the concave side of crease folded and bundled sheets SS.

The concave side of folded and bundled sheets SS means the surface of the sheets which face each other when the sheet is folded along the fold line, while the opposite surface is the convex side surface.

Vertically movable pressing means 330, and fixed stapling means 350 are located above stacking means 310.

Vertically movable staple backup means 370 is located below fold line “a” of the aligned and bundled sheets SS.

Stapling means 350 and staple backup means 370, both of which are the sheet binding means, are located at two positions in symmetry about the longitudinal center with respect to the fold line.

By the above structure, when the number of bundled sheets SS on stacking means 310 reaches a predetermined number, pressing means 330 goes down to secure bundled sheets SS, staple backup means 370 goes up, and stapling means 350 staples the staple at two portions on the fold line of bundled sheets SS.

Next, how to remove bundled sheets SS which were bound is detailed referring to FIGS. 2 and 4.

Removal means 420 to take up bundled sheets SS is composed of a supporting means and a driving means (neither of which is illustrated).

Supporting means 421 includes supporting members 422 and 423 which are located at both ends of bundled sheets SS stacked on stacking means 310. Supporting members 422 and 423 are formed of bars having bended sections 422A and 423A which are bended at a right angle to fit the fold line of bundled sheets SS.

The other ends of supporting members 422 and 423 are rotatably supported around supporting shaft 424.

Supporting members 422 and 423 are shifted to the right and left in FIG. 2, by the driving means to get below and retract from the fold of bundled sheets SS, so that stacked bundled sheets SS are supported.

Further, supporting members 422 and 423 are pivoted about supporting shaft 424 by the driving means, between the supporting position where bundled sheets SS on stacking means 310 are removed, and the delivery position where bundled sheets SS are received and transferred to conveyor 500, shown in FIG. 4.

By the above structure, after the number of bundle of sheets SS stacked on stacking means 310 reaches the predetermined number, the binding process is completed by the binding means, then, the ends of supporting means 422 and 423 are inserted under the fold of bundled sheets SS, and support the bundle of sheets, after which, supporting members 422 and 423 are pivoted from the supporting position to the delivery position, and then bundled sheets SS are placed on receiving conveyor 500, and nipped by grip 501.

Bundled sheets SS nipped by grip 501 are conveyed at a downward angle by the rotation of conveyor 500, after which bundled sheets SS are released from grip 501, and transferred onto cutter conveyor 600. Cutter conveyer 600 is a sheet conveyance section which conveys bundled sheets SS to the cutting position, and ejects them from the cutting position.

After receiving bundled sheets SS, cutter conveyor 600 shifts to the horizontal, bundled sheets SS, whose fold is creased by a fold line pressing member, detailed later, are conveyed to cutting means 700 and stop. Then, any uneven edges of the bundled sheets are cut by cutting device 700 of the present invention, resulting in even edges.

After the cutting process is completed, bundled sheets SS are conveyed by cutter conveyor 600 opposite the original direction, and fall down in the arrowed direction at the end of cutter conveyor 600, after which bundled sheets SS are transported via collecting conveyer 900 and ejected onto ejection tray 950 located at the front and on the outside of post processing device B.

Next, introduction of the bundled sheets within cutting device 700 of the present invention will be explained.

Firstly, referring to FIGS. 6(*a*) and 6(*b*), the structure will be explained wherein bundled sheets SS, which have been center-folded and bound, are conveyed from receiving conveyor 500 to cutter conveyor 600, after which, the edges of bundled sheets SS are trimmed by cutting device 700.

Figure 6:
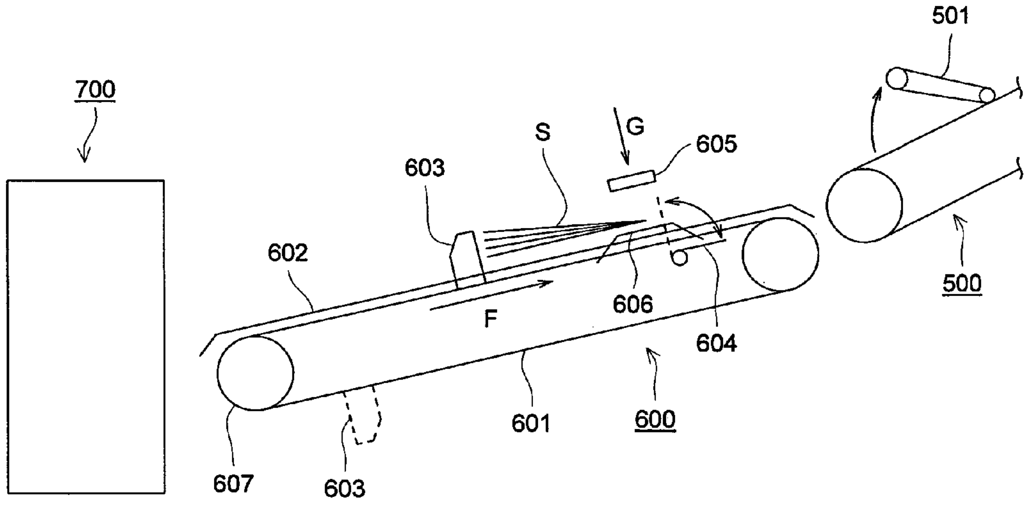
FIGS. 6 (*a*) and (*b*) are cross sectional views of cutting conveyer 600 and a conveyance mechanism for bundle of sheets SS.
Figure 6:
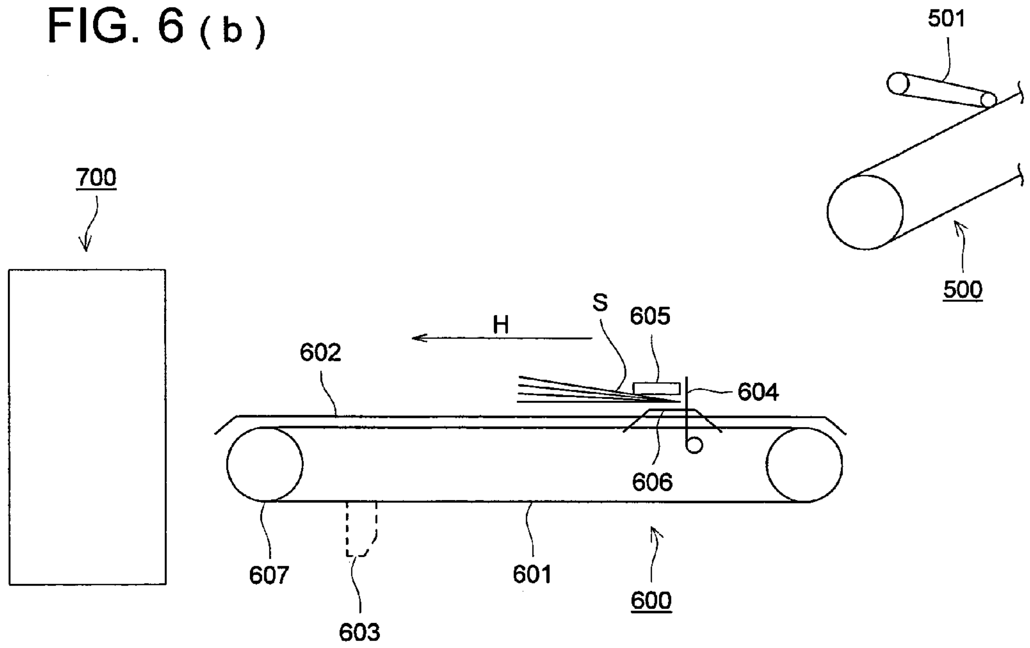

FIGS. 6(*a*) and 6(*b*) are cross sectional views of cutter conveyer 600 and the conveyance mechanism of bundled sheets SS.

As shown in FIG. 6(*a*), grip 501 opens a grip at the downstream end of the sheet receiving conveyor 500, and thereby, bundled sheets SS are released from grip 501.

In this case, cutter conveyor 600 is firstly slanted and not rotated. Sheets supporting plate 602 is mounted just above and parallel to conveyance belt 601 of cutter conveyor 600. Bundled sheets SS released from grip 501 slide on sheets supporting plate 602, and are then stopped to slide by stopper 603 fixed onto conveyance belt 601.

Next, position alignment member 604 stands up from the solid line position to the dot line position.

Then, transfer belt 601 moves in arrowed direction F, so that the fold edge of bundled sheets SS are pushed by stopper 603, and touch to alignment member 604, and are stopped there.

That is, by being pushed against alignment member 604, bundled sheets SS are aligned, and any irregular position in the conveyance direction is corrected.

After stopper 603 stops, fold pressing member 605 is lowered in arrowed direction G, so that bundled sheets SS are secured between pressing member 605 and receiving plate 606 which has the same surface as sheet supporting plate 602.

When the nipping of bundled sheets SS is completed, cutter conveyor 600 rotates and stopper claw 603 rotates to the position shown by the dotted lines.

After stopper 603 is rotated out of the way, while position alignment member 604, fold pressing member 605 and receiving plate 606 grip bundled sheets SS, they (604, 605 and 606) pivot about the center of pulley 607 of cutter conveyor 600, integrated with cutter conveyor 600, and stop at the horizontal position shown in FIG. 6(*b*).

After cutter conveyor 600 is completely horizontal, while bundled sheets SS are gripped by fold pressing member 605 and receiving plate 606, bundled sheets SS are carried on sheet supporting plate 602 in arrowed direction H, and then stop at a predetermined position, based on for each size of folded booklet.

After bundled sheets SS completely stop, the edges are trimmed by sheet cutting device 700.

Figure 7:
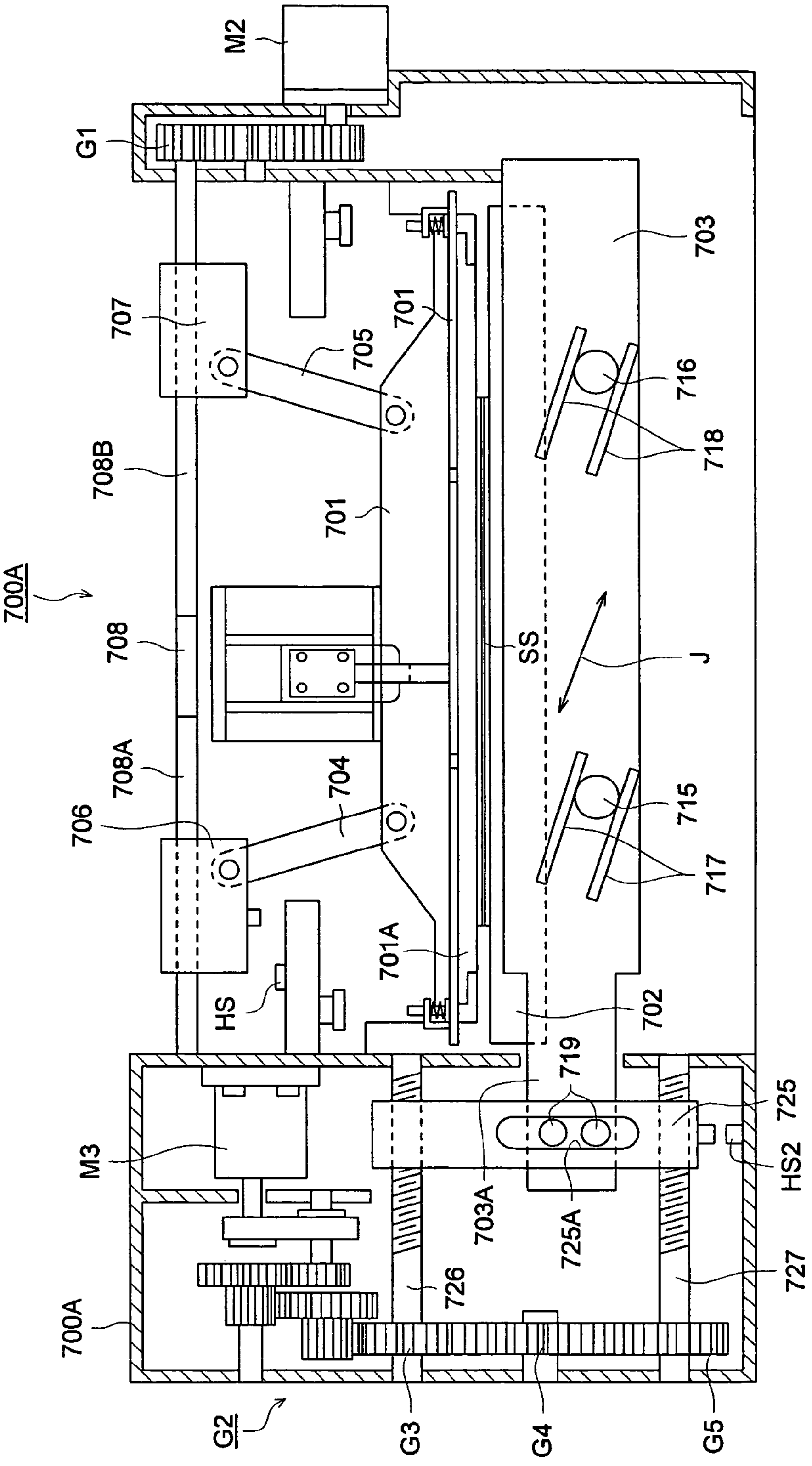
FIG. 7 is a front view of sheet cutting device 700 relating to the embodiment of the present invention.
Figure 8:
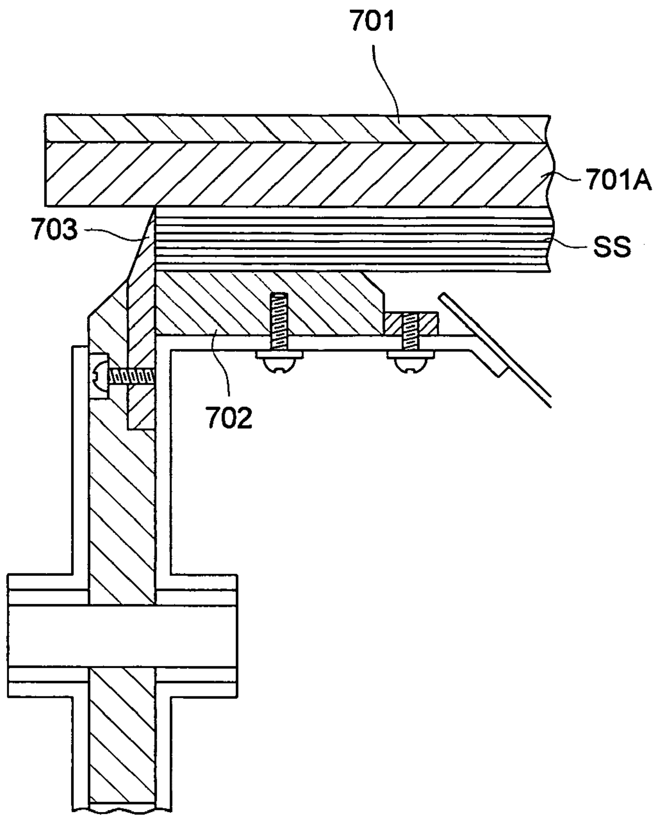
FIG. 8 is a cross sectional view of the cutting section.

Next, sheet cutting device 700 will be explained referring to FIGS. 7 and 8. FIG. 7 is a fronted view of sheet cutting device 700, while FIG. 8 is a cross sectional view of the cutting section.

On the upper section of sheet cutting device 700, shaft 708 supported by frame 700A of sheet cutting section 700 is mounted. Male screws 708A and 708B, which rotate in opposite direction, are mounted on shaft 708, and further male feed screw 708A is engaged within female screw unit 706, while male screw 708B is engaged within female screw unit 707.

Vertically movable pressing member 701 and female screw units 706 and 707 are connected by connecting arms 704 and 705. That is, the upper end of rotatable connecting arm 704 is supported by female screw unit 706, while the lower end of rotatable connecting arm 704 is supported by the left end of pressing member 701. Further, the upper end of rotatable connecting arm 705 is supported by female screw unit 707, and the lower end of rotatable connecting arm 705 is supported by the right end of pressing member 701. Since shaft 708 is engaged with motor M2 via gear G1, when motor M2 rotates, female units 706 and 707 move in opposite directions, and thereby, pressing member 701 is driven vertically by connecting arms 704 and 705, remaining parallel to the axis of shaft 708.

As described above, motor M2, female screw units 706 and 707, and connecting arms 704 and 705 structure a pressing member driving mechanism which drives pressing member 701 vertically.

Pressing member 701 includes cutter receiving member 701A, and bundled sheets SS are gripped and secured between cutter receiving member 701A and supporting plate 702. Since pressing member 701 is driven by a driving mechanism including male screws 708A and 708B under a greatly reduced gear ratio, pressing member 701 presses bundled sheets SS under high pressure.

Rollers 715 and 716 are fixed on cutter blade 703 whose top edge is the blade, and guided by guide members 717 and 718, both of which are slanted to the right. Guide members 717 and 718 are firmly fixed to frame 700A.

Cutter driving member 725 is driven in the horizontal direction via male screws 726 and 727. Male screws 726 and 727 are driven by motor M3 via gears G2-G5. Further, vertical slot 725A is formed on cutter driving member 725, and engages two pins 719 which are fixed on end 703A of cutter blade 703.

The driving mechanism of cutter blade 703 is composed of motor M3, gears G2-G5, male screws 726 and 727, and cutter driving member 725, whereby cutter blade 703 is driven in the horizontal direction. Cutter blade 703 is raised and lowered by guide members 717 and 718 at an angle in arrowed direction J Next, the operation of cutting device 700 will be explained.

In standby status, pressing member 701 is at its upper limit, being the home position.

When bundled sheets SS are introduced into cutting device 700, motor M2 is activated so that female screw units 706 and 707 move, and thereby, pressing member 701 is lowered. Under the condition that receiving member 701A presses bundled sheets SS, pressing member 701 stops lowering.

When the plurality of stacked bundled sheets SS are trimmed, in order to prevent generation of their misalignment due to horizontal force, pressing member 701 evenly presses the whole surface of bundled sheets SS with great force so that they are not misaligned by the horizontal force generated by cutter blade 703.

When bundled sheets SS have been completely pressed, motor M3 is activated which moves cutter blade 703 toward the upper left, shown by arrow J. By this movement of cutter blade 703, any uneven edges of bundled sheets SS are cut as shown in FIG. 8. Since the cutting action of cutter blade 703 is performed via sliding of cutter blade 703, the cutting action can be performed with a relatively small driving force. In addition, even when a large number of the sheets are cut, the driving force does not change, though the stroke length of the cutter does change.

After all of the stacked bundles are cut, the cutting edge of cutter blade 703 comes into contact with cutter receiving member 701A, whereby, the resistance against the driving force of cutter blade 703 increases. The controller detects the increased current loaded in motor M2, caused due to the resistance, that is, it detects the increase of motor driving current, and deactivates driving motor M2. The total bundles included in bundled sheets SS are cut in this manner.

After the edge of the sheets are cut, motor M2 is reactivated, and rotated in the opposite direction of the above procedure, to retract pressing member 701. Further, motor M3 is activated to lower cutter blade 703 to the predetermined position in the lower right of FIG. 7, and cutter blade 703 finally stops at the lower limit position, being the home position.

After the cutting process is completed, cutter conveyor 600 is reactivated and under the condition that bundled sheets SS have been released by fold pressing member 605, bundled sheets SS are pushed by stopper 603 and conveyed to collecting conveyor 900, and ejected to bundled sheets collecting tray 950 (see FIG. 4).

Figure 9:
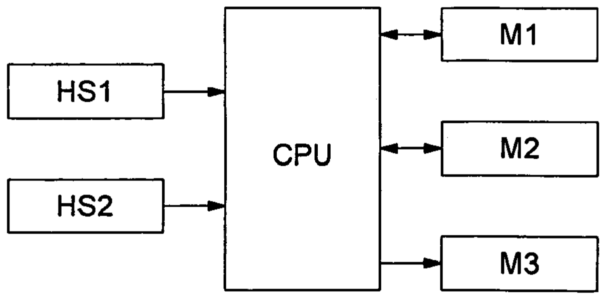
FIG. 9 is a block diagram of the control system of sheet cutting device 700 shown in FIG. 7.
Figure 10:
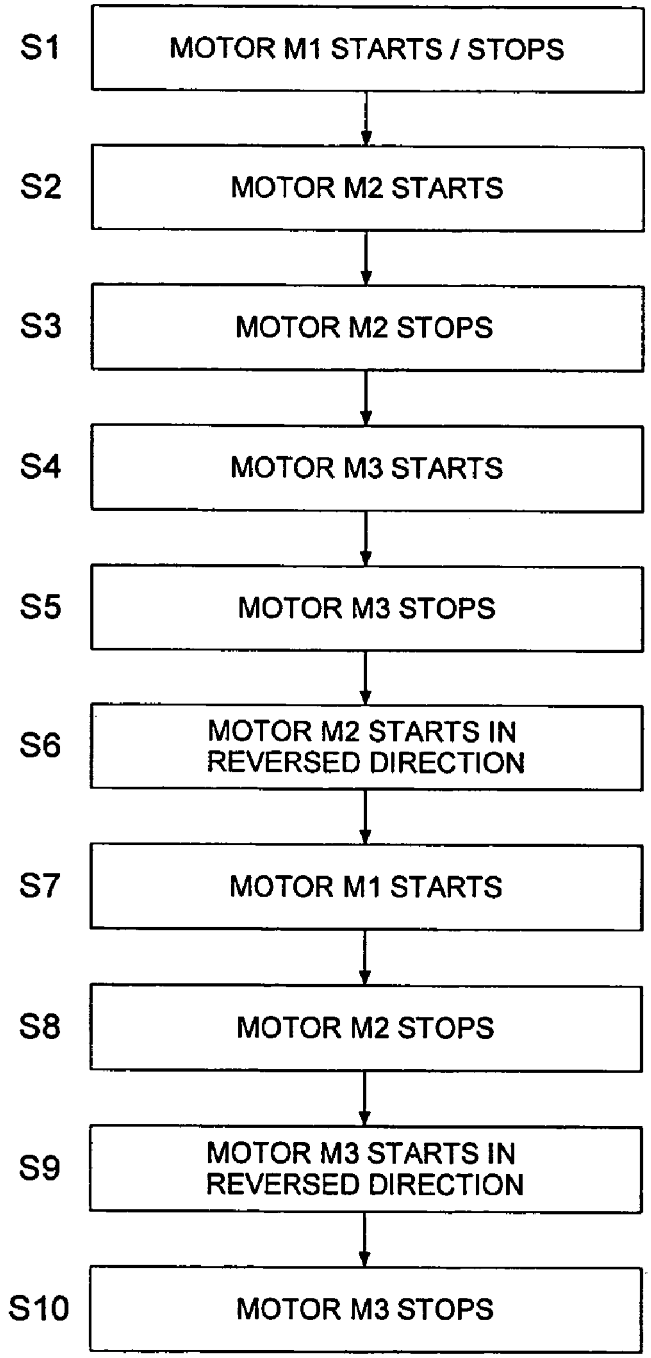
FIG. 10 is a flow chart showing the operational sequence of sheet cutting device 700 shown in FIG. 7.

The operation of sheet cutting device 700 relating to the embodiment of the present invention will now be detailed referring to FIGS. 9 and 10. FIG. 9 is a block diagram of the control system of sheet cutting device 700 shown in FIG. 7, while FIG. 10 is a flow chart showing the operational sequence of sheet cutting device 700 shown in FIG. 7.

CPU (Central Processing Unit) is a controller to totally control sheet cutting device 700, HS1 is a home position sensor to detect the upper limit, being a home position of pressing member 701 (see FIG. 7), HS2 is the home position sensor to detect the lower limit, being the home position of cutter blade 703 (see FIG. 7), M1 is a motor to activate cutter conveyor 600 (see FIGS. 4 and 6), being a sheet take-out means, M2 is a motor serving as a pressing section driving means which vertically drives pressing section 701, and M3 is a motor serving as a cutter driving means which drives cutter blade 703 in the vertical direction.

It is preferable that a stepping motor is used for motor M1, while DC motors are used for motor M2 and M3.

In step S1 in FIG. 10, motor M1 is operated for a predetermined number of steps, and stopped so that bundled sheets SS are set on the cutting position. The predetermined number of steps of motor M1 is determined based on the size of the folded sheets.

In step S2, motor M2 is activated after a predetermined time interval after motor M1 has stopped, whereby pressing member 701 is driven downward.

In step S3, motor M2 is stopped, because controller CPU detects the increase in current demand of motor M2. In this way, motor M2 is stopped by the detection of the increased current demand. And thereby, pressing member 701 goes downward and stops at the position where pressing member 701 always presses bundled sheets SS at a constant pressure, and secures bundled sheets SS uniformly.

In step S4, motor M3 is activated, after motor M2 is stopped. Cutter blade 703 is driven upward, as shown by arrow J in FIG. 7, and cuts bundled sheets SS.

In step S5, cutter blade 703 is stopped because CPU detects the increased current demand in motor M3. Using the stopping method of motor M3 via the detection of the increased current demand, motor M3 is stopped, when the cutting edge of cutter blade 703 comes into contact with cutter receiving member 701A of pressing member 701. Accordingly, the total sheets in bundled sheets SS are positively cut.

In step S6, motor M2 is reactivated, but the rotation of motor M2 is opposite to that of step S2. Due to reversed rotation, pressing member 701 goes up, and thereby bundled sheets SS are released. In step S6, motor M2 is reactivated after motor M3 has stopped.

In step S7, motor M1 is reactivated, and the trimmed bundled sheets SS are discharged from the cutting position and ejected. That is, bundled sheets SS are conveyed in the direction opposite of arrow H in FIG. 6, toward collecting conveyor 900, in FIG. 4. The activation of motor M1 in step S7 is conducted after a predetermined time after the activation of motor M2. The predetermined time is after the pressure release of bundled sheets SS to the time when bundled sheets SS can be discharged. Reducing this predetermined time is preferable to increase operational efficiency.

In step S8, motor M2 is stopped by controlier CPU, when CPU receives a signal showing that home position sensor HS1 has detected the upper limit of pressing member 701.

In step S9, motor M3 is reactivated, since the rotating direction of motor M3 is opposite to the direction in step S4, cutter blade 703 is driven downward. This reactivation of motor M3 is conducted by a signal indicating the stoppage of motor M2.

In step S10, when CPU receives a signal showing that home position sensor HS2 has detected the lower limit of cutter blade 703, motor M3 is deactivated by controller CPU. Additionally, motor M1 is deactivated when CPU detects the completion of feeding of bundled sheets SS.

As described above, after bundled sheets SS are cut, before cutter blade 703 retracts to the retraction position, pressing member 701 goes up. Due to this, bundled sheets SS can be discharged just after they are cut. Accordingly, before the cutting operation is completed, that is, before the both of pressing member 701 and cutter blade 703 come back to their home positions, the following bundled sheets SS can be conveyed to sheet cutting device 700. Bundled sheets SS coming next can be introduced simultaneously to the operation of motor M2 reactivated in step S6, as well as to the operation of steps S8-S10. By these procedures, sheet cutting device 700 and sheet post-processing device B can be operated efficiently.

Additionally, in the present embodiment, when pressing member 701 starts raising, bundled sheets SS are conveyed by the activation of motor M1. However, it is also possible to structure the operation procedure in such way that firstly cutter blade 703 begins to retract, and next bundled sheets SS start to discharge, which will be operated within the scope having no influence upon the operation efficiency.

Further, it is possible to start the retraction of cutter blade 703 which is performed by the reactivation (reversed rotation) of motor M3 in step 9, before motor M2 stops (before step 8).

Still further, since removal operation of bundled sheets SS are performed when cutter blade 703 exists at the raising position, bundled sheets SS are removed in the condition that a sheets entrance side and a chips ejecting side with respect to cutter blade 703 are separated by cutter blade 703. That is, the removal operation are performed when the right side and the left side of cutter blade 703 in FIG. 8 are separated by cutter blade 703. Due to this, the cut chips are prevented from flying in the direction to the sheets entrance side, that is, the right side of cutter blade 703.

The operational procedure described above can overcome the undesired phenomenon caused by the flying chips, such as bad influence upon the sheet conveyance or adhering onto the trimmed bundled sheets.

According to the present invention, just after the bundled sheets are cut, and before the cutting process of a single bundle of sheets is completed, the bundled sheets can be removed from the cutting device. Accordingly, the cutting process of the following bundled sheets can be started promptly, and thereby, increased is the operation efficiency of the sheet cutting device and the post-processing device incorporating said sheet cutting device.

Further, after the trimmed and bundled sheets are discharged, the cutter blade separates the chips ejecting side from the bundled sheets entrance side, the chips generated by the cutting operation of the bundled sheets do not fly into the bundled sheets entrance side.

Still further, when the cutter blade is raised after cutting, firstly the pressing member, which also serves as the receiving member of the cutter blade, is raised vertically, and thereby, the contact of the cutter blade and the pressing member is controlled within the smallest scope, resulting in the reduction of the separating noise.

What is claimed is:

1. A sheet cutting device, comprising:

a cutting blade to cut top portions of a bundle of sheets carrying images, while moving at a slanted direction whose component is a compound of moving perpendicular to a surface of sheet and simultaneously parallel to the surface of sheet;

a supporting member to support the bundle of sheets carrying the images at a cutting position;

a pressing section to press the bundle of sheets carrying the images placed on the supporting member in a direction reverse to a moving direction of the cutting blade and perpendicular to the surface of sheet, and to receive the cutting blade when the cutting blade cuts the top portions of the bundle of sheets carrying the images;

a cutting blade driving section to drive the cutting blade to cut the top portions of the bundle of sheets carrying the images, and to stop the cutting blade when the top portions of the bundle of sheets carrying the images have been cut;

a pressing section driving section to drive the pressing section to press the bundle of sheets carrying the images, and to release pressing of the bundle of sheets carrying the images, from which the top portions have been cut;

a conveying section to convey the bundle of sheets carrying the images to the cutting position, and after the top portions of the bundle of sheets carrying the images have been cut, the conveying section discharges the bundle of sheets carrying the images from the cutting position in a direction opposing a conveying direction in which the bundle of sheets carrying the images is conveyed to the cutting position; and a control section to control the cutting device in such procedures that the conveying section conveys the bundle of sheets carrying the images to the cutting position, after that, the pressing section driving section drives the pressing section to move downwardly, so that the bundle of sheets carrying the images is pressed by the pressing section at the cutting position, after that, the cutting blade driving section drives the cutting blade to move upwardly to cut the top portions of the bundle of sheets carrying the images, after that, after the cutting blade has completed cutting the top portions of the bundle of sheets carrying the images, the pressing section releases pressing of the bundle of sheets carrying the images, from which the top portions have been cut, the conveying section discharges the bundle of sheets carrying the images from the cutting position in the direction opposing the conveying direction in which the bundle of sheets carrying the images is conveyed to the cutting position, after that, the cutting blade driving section drives the cutting blade downwardly to retract from a position where the cutting blade has completed cutting the top portions of the bundle of sheets carrying the images.

2. The sheet cutting device of claim 1, wherein the cutting blade driving section and the pressing section driving section include a motor.

3. The sheet cutting device of claim 1, further comprising a bundled sheets discharging section which discharges the bundle of sheets carrying the images whose top portions have been cut from the cutting position.

4. The sheet cutting device of claim 1, wherein the cutting blade is rectangular.

5. A sheet post-processing device, comprising:

a binding device to bind a bundle of sheets; and the sheet cutting device of claim 1 to cut the bound bundle of sheets.

6. An image forming system, comprising:

an image forming apparatus to form an image on a sheet; and the sheet post-processing device of claim 5 to post-process the sheet carrying the image formed by the image forming apparatus.

* * * * *